United States Patent [19]

Noble, Sr. et al.

[11] 4,279,704
[45] Jul. 21, 1981

[54] DRY CLEANING STILL APPARATUS

[76] Inventors: Kenneth E. Noble, Sr.; Kenneth E. Noble, Jr., both of 390 N., U.S. Hwy. 31 S., Whiteland, Ind. 46184

[21] Appl. No.: 176,264

[22] Filed: Aug. 8, 1980

[51] Int. Cl.³ .............................................. B01D 3/02
[52] U.S. Cl. ..................................... 202/175; 203/4; 203/DIG 25
[58] Field of Search ...................... 202/170, 175, 265; 203/4, DIG 7, DIG 25

[56] References Cited

U.S. PATENT DOCUMENTS

| 563,391 | 7/1896 | Metzger | 202/175 |
| 2,476,335 | 7/1949 | Tusson | 202/175 |
| 2,480,320 | 8/1949 | Carrier | 210/785 |
| 2,784,150 | 3/1957 | Rose | 202/205 |
| 3,100,190 | 8/1963 | Hobson | 210/785 |
| 3,262,568 | 7/1966 | Zehrback | 210/785 |
| 3,335,083 | 8/1967 | Tidball | 210/711 |
| 3,672,958 | 6/1972 | McCandlish | 202/175 |
| 3,980,527 | 9/1976 | Lapeyre | 202/175 |

FOREIGN PATENT DOCUMENTS 11862 of 1847 United Kingdom ..................... 202/175

Primary Examiner—Ernest G. Therkorn

[57] ABSTRACT

Disclosed is a filter assembly which includes rigid, perforated stainless steel tubes each of which is received in a removable, nylon mesh bag. Also disclosed is a still for reclaiming dry cleaning solvents which includes a free running auger component which is angularly reciprocated over the base of the still to dislodge the residue of the distillation process so that it can be flushed from the still by hot water.

3 Claims, 6 Drawing Figures

DRY CLEANING STILL APPARATUS

BACKGROUND OF THE INVENTION

In closed dry cleaning systems using chlorinated solvents, the solvent, during the filter cycle portion of the cleaning process, is conventionally passed by pressure through a filter assembly filter aid. Filters of the type referred to are disclosed in U.S. Pat. Nos. Carrier, 2,480,320, Hobson, 3,100,190 and Zehrback, 3,262,568. At the conclusion of a cleaning operation of predetermined length, the contaminated liquid solvent and the filter aid, dislodged from the filter elements and suspended in the liquid, are passed to a pot-type still where the solvent is distilled, separated from any water entrained in the distilled liquid, and returned to a storage tank for reuse. In the still, the toxic dust residue from the distilling process has, heretofore, been permitted to accumulate at the base of the still from which it is, at intervals, manually removed through a clean-out access door in the still. This removal operation is time consuming and, because of the toxic nature of the residue, extensive safety precautions for personnel engaged in the removal are necessary. The present invention is related to to an improved apparatus for removing the solid residue from a conventional dry cleaning solvent recovery still.

The apparatus of the present invention utilizes a free-running auger screw component moved in a reciprocating pattern over the base of the still to put the residue dust into a flushing stream of hot water introduced into the still and drained into the sewage system.

The filter assembly is composed of a tube header plate which accommodates a series of cylinders formed by perforated, rigid, stainless steel tubes. Drawn over each of the tubes is a nylon mesh bag which closely overlies the tubes and against which the filter powder is held by the pressure differential between the interior of the tubes and the space exterior to the tubes. The spacing of the tubes and their rigidity, contrasted with the deformable woven wire mesh tubes conventionally used, provide ease of disassembly for cleaning or repair.

DESCRIPTION OF THE PREFERRED EMBODIMENT

Figure 1:
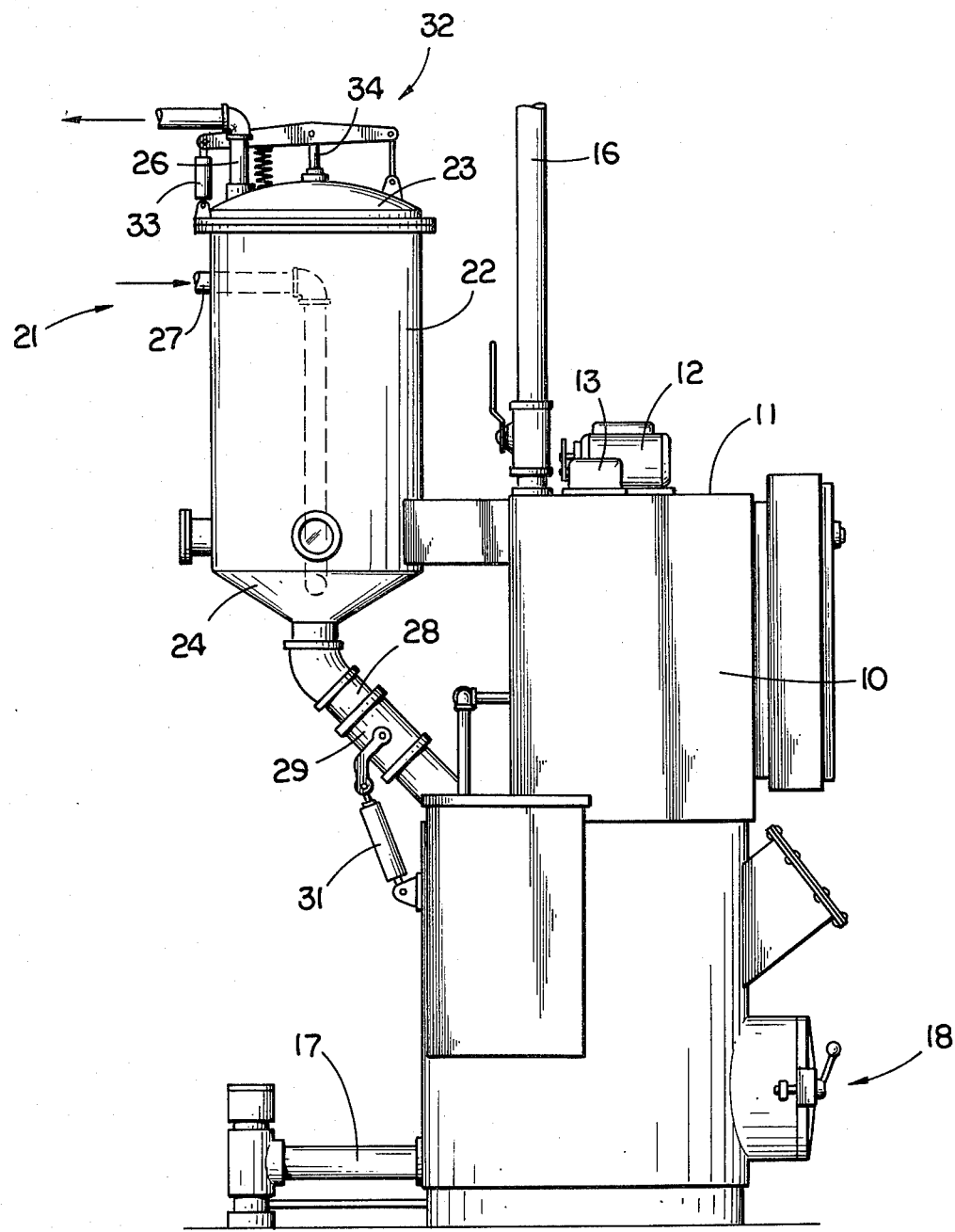
FIG. 1 is a side elevation of a solvent recovery still and filter assembly embodying the present invention.

As may be seen in FIG. 1, a recovery still embodying the present invention includes an upright cylindrical vessel or housing 10 having a top plate 11. A motor 12 and gearbox 13 provide a drive for an auger assembly to be described with reference to FIG. 5. A vent 16 extends upwardly from the still. A drain 17 extends from the lower portion of the still and an access, cleanout door 18 is also present at the lower portion of the still.

Adjacent to the still and somewhat above it is a filter assembly 21 composed of a cylindrical housing 22, an upper cap 23 and a conical base 24. The filtered output of the filter assembly, in the normal dry cleaning operation exits through the outlet conduit 26. Contaminated, used fluid to be filtered enters the unit through the inlet conduit 27. The inlet and outlet flow is controlled by suitable valves (not shown). The base 24 has issuing from it a dump or draining conduit 28, controlled by a dump valve 29 which has a solenoid actuator 31. The conduit 28 opens into the still housing 10 as may best be seen in FIG. 5. The upper cap 23 of the filter supports a conventional "bumping" or shaker means 32 actuated by a solenoid 33, the shaft 34 of the means 32, when raised and lowered, serving to move the bank of filter tubes within the housing 22.

Figure 2:
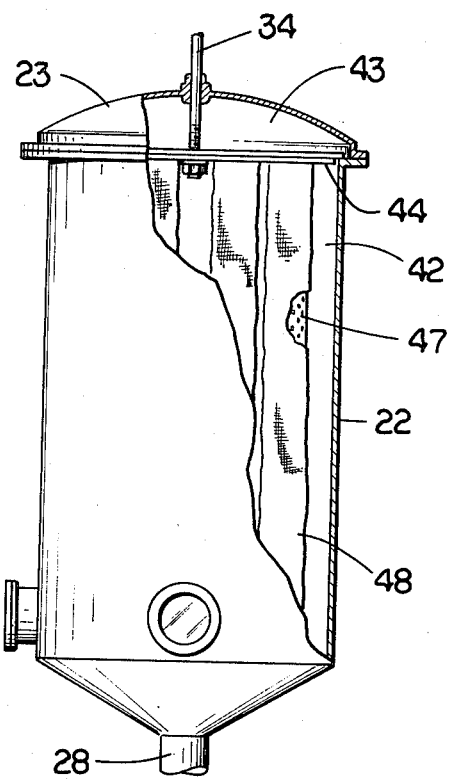
FIG. 2 is a side elevation of the filter assembly with a portion of the outer shell broken away.
Figure 3:
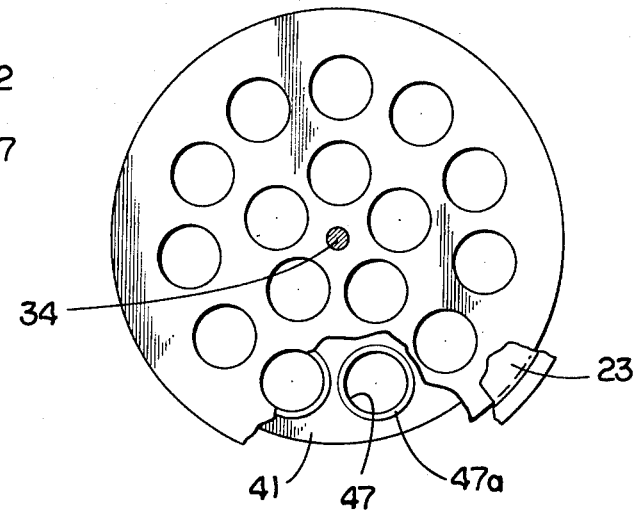
FIG. 3 is a top plan view of the filter assembly shown in FIG. 2 with a portion of the retainer or header plate broken away.
Figure 4:
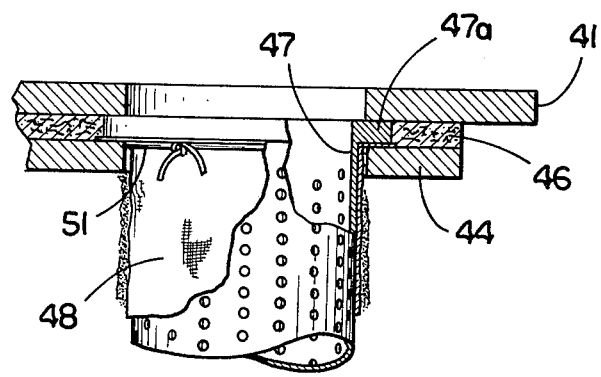
FIG. 4 is an enlarged, fragmentary, sectional view shoning the tube mounting construction.

Referring specifically to FIGS. 2, 3 and 4, the bank of filter tubes, or filter assembly, may be seen to be composed of a first or upper header plate 41 dividing the interior of the housing 21 into an inlet chamber 42 and an outlet chamber 43. A second header, or tube retaining plate 44 closely underlies plate 41 and a felt gasket 46 is interposed between the plates. As may be seen in FIG. 3, each of the plates and the gasket have a series of circularly arranged apertures.

Extending through each of the apertures in plate 44 are perforated, stainless steel filter tubes 47. The tubes are outwardly flanged at 47a to extend between plates 41 and 44 in the general plane of gasket 46. The tubes are thus mounted by the header plates and, as may best be seen in FIGS. 2 and 4, each is enclosed by a nylon mesh bag 48 which extends to the upper, flanged end of each tube and is removably secured by any suitable means such as a tie-cord 51 (FIG. 4). In the operation of the filter, a layer of filter powder 52 (FIG. 4) such as diatomaceous earth, is deposited against the outer surface of the bags 48.

In operation, the movement of fluid across the filter from chamber 42 to chamber 43 under pressure initially deposits a coating of filter powder on the bags 48. Subsequent movement of contaminated fluid through the filter deposits the contaminating particles on the filter powder, the filtered fluid being pumped through outlet 26 (FIG. 1) back to the dry cleaning apparatus for reuse or storage.

Figure 6:
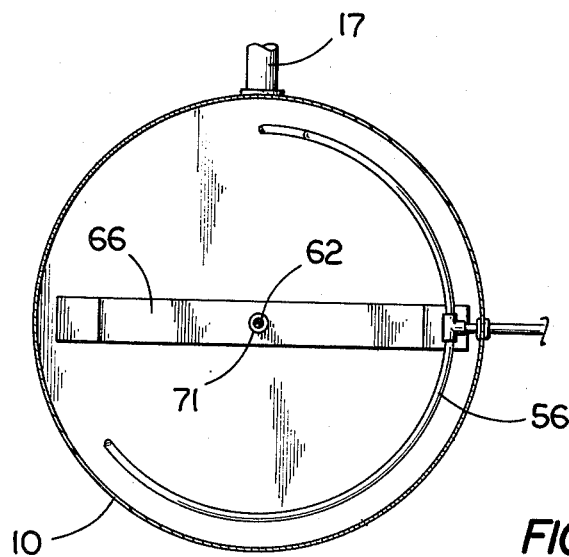
FIG. 6 is a sectional view taken generally along the line 6-6 of FIG. 5.
Figure 5:
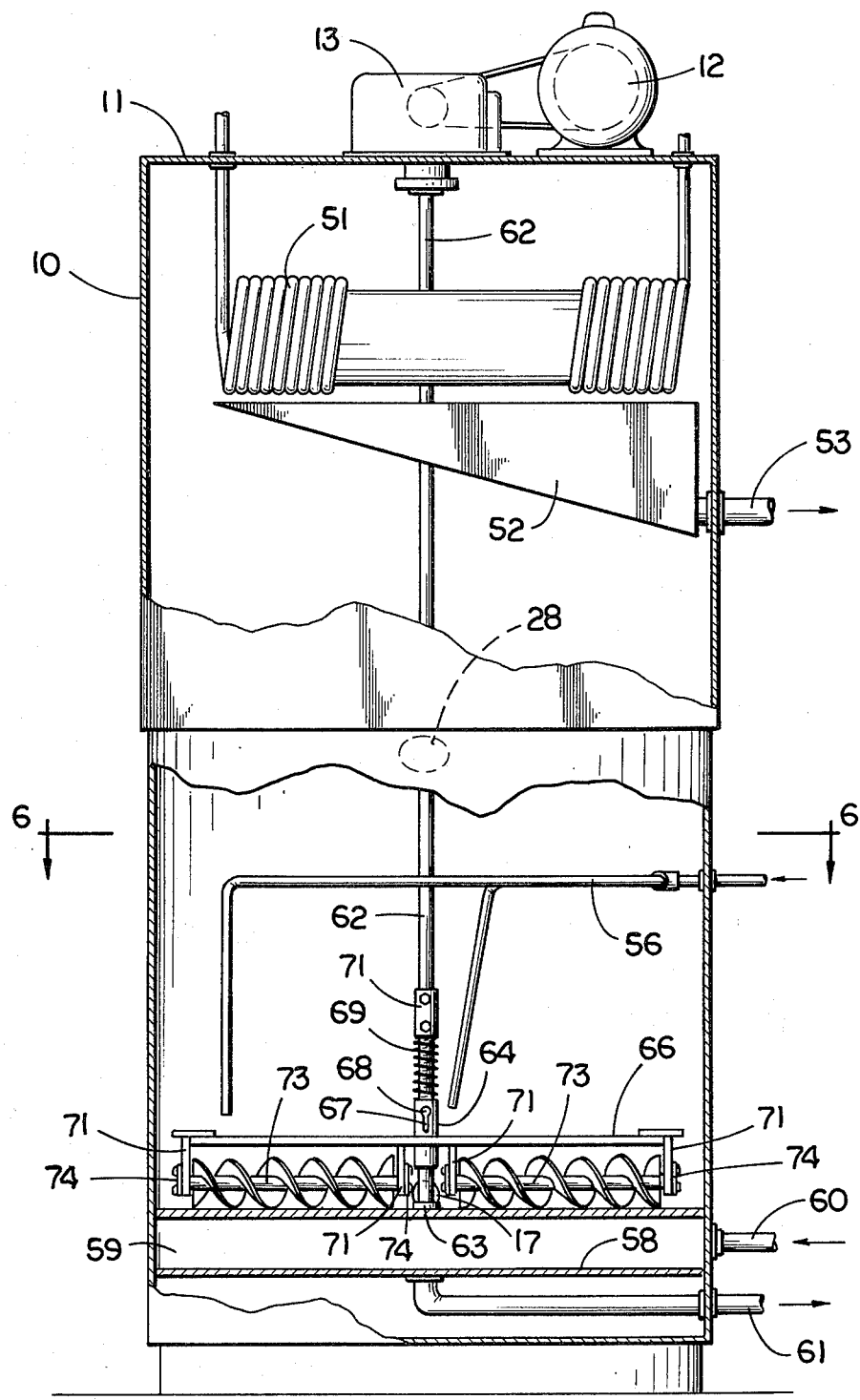
FIG. 5 is a side view of the still with portions broken away.

Referring now to FIGS. 5 and 6, the auger structure within the still housing 10 will be described in detail. Extending across the upper portion of the housing interior is a condenser coil 51 whose ends extend through the plate 11 and are adapted to be connected to a pressurized supply of cooling water (not shown) which circulates through the condenser coils. Below the condenser coils is an inclined pan 52 which collects the liquid condensate falling from coils 51 and directs it to the condensate outlet 53.

The wall of the still housing may be provided with a sight-glass 54 (FIG. 1) which permits viewing the housing interior for determining the desired quantity of contaminated solvent to be admitted into the still through conduit 28 from the filter assembly chamber 42.

A steam sweep tube 56 extends into the housing and in an arc about the inner face of the side wall of housing 10. The terminal portions of the tube are directed downwardly, as may be seen in FIG. 5. The tube 56 is connected to a source of steam, the steam issuing from the tube at a predetermined time in the distilling cycle to assure that all of the solvent is vaporized. The base of the still is formed by spaced, horizontal plates 57 and 58 which form a steam boiler area 59. Steam is introduced into the boiler through steam input pipe 60 which is connected to a suitable source of steam, not shown, and exits through pipe 61.

The output of gearbox 13, atop the still, rotates a drive shaft 62 which extends vertically through the still and is journalled, at its lower end, in a bearing 63. Secured to shaft 62 by means of sleeve 64 is a diametrically extending arm 66. The sleeve is slotted, at 67, and receives a pin 68 extending radially from shaft 62 so that the arm and sleeve may be moved, through a limited range, on the shaft. A compression spring 69 bottomed on abuttment 71 urges the arm toward its lowermost position. The arm 66 intersects the shaft axis at the arm midpoint and the two radially extending arm portions terminate adjacent the housing sidewall. Flanges 71 depend from the arm and carry aligned bearings 72. The bearings support, for free rotation, the auger members 73. When motor 13 rotates shaft 62, in angularly reciprocating fashion, the auger members, urged into engagement with plate 65 by spring 69, move over the surface of plate 57 (forming the lower wall of the distilling chamber) loosening the solid particle residue from the distillation of the solvent.

The still is operated after the filter media in the filter assembly has been saturated with dirt such that flow across the filter tubes decreases to an undesirable low level. The contaminated filter media is then loosened by moving rod 34 and the residual solvent and filter media, now broken loose from the filter tubes, is transferred, through pipe 28, to the still. Steam is introduced through pipe 59 and condensing water flows through coils 51. As distillation proceeds, the shaft 62 sweeps the auger members over the surface of plate 57. Subsequently, when the distillation process is complete, the residual contaminated filter media, moved toward the outer margin of plate 57 by the auger members, is flushed out the drain conduit 17 by hot water introduced through tube 56.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A dry cleaning solvent recovery still including an upright cylindrical body having means for introducing liquid solvent containing finely divided solids into the still body to a predetermined depth, means for heating the liquid above its boiling point, a condensing coil disposed adjacent the upper end of the still body for condensing the solvent vapor and draining it to the exterior of the still body, the still being characterized by a drive shaft extending into the interior of the still and supporting for free rotation two coaxial auger members spanning the diameter of said still body adjacent the base thereof, and power means exterior of the still body for rotating said drive shaft to move the auger members over the base of the still body to agitate and divide the solid residue of the liquid distillation said auger members being supported by an arm mounted at its midpoint to said drive shaft and diametrically spanning the base of said still body, spaced depending flanges on said arm supporting an auger shaft for free rotation on each of the two radial portions of the arm, and means for flowing steam and hot water through the still after distillation has halted for flushing the finely divided solids from the still.

2. A dry cleaning solvent recovery still as claimed in claim 1 in which resilient means are provided to urge said auger members against the base of the still body as they are moved by said drive shaft.

3. A dry cleaning solvent recovery still as claimed in claim 1 in which said drive shaft extends vertically through said still body and said arm moves in a horizontal plane.

* * * * *